US010797462B1

United States Patent
Doerr et al.

(10) Patent No.: US 10,797,462 B1
(45) Date of Patent: Oct. 6, 2020

(54) ER-DOPED WAVEGUIDE INTEGRATION IN SILICON PHOTONICS

(71) Applicant: Acacia Communications, Inc., Maynard, MA (US)

(72) Inventors: Christopher Doerr, Middletown, NJ (US); Long Chen, Marlboro, NJ (US); Mohamadreza Banaee, Watchung, NJ (US); Xingyu Zhang, Matawan, NJ (US)

(73) Assignee: Acacia Communications, Inc., Maynard, MA (US)

( * ) Notice: Subject to any disclaimer, the term of this patent is extended or adjusted under 35 U.S.C. 154(b) by 481 days.

(21) Appl. No.: 15/636,605

(22) Filed: Jun. 28, 2017

Related U.S. Application Data (60) Provisional application No. 62/355,800, filed on Jun. 28, 2016.

(51) Int. Cl.
  *H01S 3/063* (2006.01)
  *H01S 3/16* (2006.01)
  *H01S 3/094* (2006.01)

(52) U.S. Cl.
  CPC ...... *H01S 3/0637* (2013.01); *H01S 3/094049* (2013.01); *H01S 3/1608* (2013.01)

(58) Field of Classification Search
  CPC .......................... H01S 3/0637; H01S 3/094049
  See application file for complete search history.

(56) References Cited

U.S. PATENT DOCUMENTS

| | | | |
|---|---|---|---|
| 6,391,214 B1 | 5/2002 | Kovacic | |
| 9,325,140 B2* | 4/2016 | Purnawirman | ....... H01S 3/1608 |
| 2004/0090661 A1* | 5/2004 | Nicolaescu | ............ H01S 3/063 359/326 |
| 2005/0195472 A1* | 9/2005 | Tang | ..................... H01S 3/0632 359/333 |
| 2014/0111793 A1 | 4/2014 | Asghari et al. | |
| 2014/0319656 A1 | 10/2014 | Marchena et al. | |
| 2015/0139264 A1* | 5/2015 | Zhang | ..................... H01S 5/141 372/107 |
| 2016/0156147 A1* | 6/2016 | Raino | .................. G02B 6/1228 359/341.3 |
| 2016/0308618 A9 | 10/2016 | Doerr et al. | |
| 2018/0358773 A1* | 12/2018 | Oda | ......................... G02F 1/35 |

OTHER PUBLICATIONS

Purnawirman et al. "C- and L-band erbium-doped waveguide lasers with wafer-scale silicon nitride cavities", Optics Letters vol. 38, No. 11, Jun. 1, 2013 (Year: 2013).*

(Continued)

*Primary Examiner* — Eric L Bolda
(74) *Attorney, Agent, or Firm* — Joseph D'Angelo (57) ABSTRACT

Aspects of the present application are related to an Er-doped waveguide amplifier (EDWA) structure integrated in an uncooled silicon photonic transceiver and methods for fabricating the same. In some embodiments, the structure comprises three layers of waveguides: silicon, silicon nitride and Er-doped dielectric. The three layers of waveguides are integrated with an uncooled 980-nm pump laser. In some embodiments, the Er-doped dielectric waveguides are fully etched.

16 Claims, 5 Drawing Sheets

(56) References Cited

OTHER PUBLICATIONS

Komljenovic et al. "Heterogeneous Silicon Photonic Integrated Circuits", Journal of Lightwave Technology, vol. 34, No. 1, pp. 20-35, Jan. 1, 2016 (Year: 2016).*
Agazzi et al., Monolithic integration of erbium-doped amplifiers with silicon-on-insulator waveguides. Optics Express. Dec. 2010;18(26):27703.
Purnawirman et al., C- and L-band erbium-doped waveguide lasers with wafer-scale silicon nitride cavities. Optic Letters. 2013;38(11):2-5.

* cited by examiner

ER-DOPED WAVEGUIDE INTEGRATION IN SILICON PHOTONICS

CROSS-REFERENCE TO RELATED APPLICATIONS

This application claims the benefit under 35 U.S.C. 119(e) of U.S. Patent Application Ser. No. 62/355,800, filed Jun. 28, 2016 and entitled "ER-DOPED WAVEGUIDE INTEGRATION IN SILICON PHOTONICS," which is hereby incorporated herein by reference in its entirety.

BACKGROUND

Optical amplifiers provide amplified optical output power based on an optical input. Some optical transceivers require optical gain to achieve the required output power. One way to provide optical gain is to use an optical amplifier in the optical transceiver.

SUMMARY

Aspects of the present application provide a photonic integrated circuit having three layers of waveguides of different materials and a pump laser optically coupled to a middle layer of the three layers of waveguides. In some embodiments, one of the waveguide layers includes an erbium-doped waveguide.

In some embodiments, a photonic integrated circuit is provided. The photonic integrated circuit comprises a base, a first waveguide comprising a first material disposed on the base in a first plane, a second waveguide comprising a second material disposed on the base in a second plane, and a third waveguide comprising a third material disposed on the base in a third plane. The second plane is disposed in between the first plane and third plane. The photonic integrated circuit further comprises a pump laser disposed on the base. The pump laser is configured to provide pump light to the second waveguide of the second material. The pump light has a center wavelength between 880 nm and 1080 nm.

In some embodiments, a photonic integrated circuit is provided. The photonic integrated circuit comprises a base, a waveguide amplifier disposed on the base, and a silicon waveguide disposed on the base. The silicon waveguide is configured to provide a first optical signal. The photonic integrated circuit also comprises a pump laser disposed on the base with a pump laser output. The pump laser is configured to provide pump light at the pump laser output with a center wavelength between 880 nm and 1080 nm. The photonic integrated circuit further comprises a multiplexer disposed on the base with a first input coupled to the silicon waveguide, a second input coupled to the pump laser output and a multiplexer output coupled to the waveguide amplifier. The multiplexer is configured to provide at the multiplexer output a second optical signal based in part on a combination of the first optical signal and the pump light.

In some embodiments, a method for fabricating a photonic integrated circuit is provided. The method comprises forming a silicon waveguide configured to provide a first optical signal on a base, and forming a multiplexer on the base. The multiplexer is configured to combine the first optical signal and pump light from a pump laser to form a second optical signal. The method further comprises forming a waveguide amplifier on the base, the waveguide amplifier configured to receive the second optical signal. In some embodiments, the pump light has a center wavelength between 880 nm and 1080 nm.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear. For purposes of clarity, not every component may be labeled in every drawing.

DETAILED DESCRIPTION

Compared to conventional optical amplifiers which are distinct from microfabricated waveguide structures, such as a silicon photonics integrated circuit, the inventors have recognized that integrating an optical amplifier into a photonic integrated circuit (PIC) may provide various benefits. For example, integrating an optical amplifier into a PIC may, and in some embodiments does, save cost and footprint compared to having a distinct optical amplifier. Thus, some aspects of the present application are related to a waveguide structure including multiple layers (or levels) of waveguides, one or more of which is an optical amplifier. In some embodiments, the optical amplifier may be an Erbium-doped (or simply "Er-doped") waveguide. In some embodiments, a three-waveguide-layer structure including waveguides at three levels within an integrated structure is provided. In some embodiments, the three-waveguide-layer structure in some embodiments includes a silicon waveguide, a waveguide amplifier, and a dielectric waveguide positioned at a level between the silicon waveguide and the waveguide amplifier and coupled with a pump laser.

Some aspects of the present application provide a PIC with a waveguide amplifier for amplifying optical signals transmitted from a silicon waveguide in the PIC. In some embodiments, the waveguide amplifier may be an Er-doped $Al_2O_3$ waveguide amplifier. In some embodiments, during operation, pump light is provided from a pump laser to the waveguide amplifier. In some embodiments, the silicon waveguide provides an optical signal to an input of the optical amplifier, which is amplified inside the waveguide amplifier. The inventors have recognized that using pump light with a shorter center wavelength may provide higher pump light photon energy and higher amplification performance compared to a pump light with longer center wavelength. Thus, in some embodiments the pump light used has a center wavelength of approximately 980 nm.

According to an aspect of the present application, a PIC is provided including a waveguide amplifier and a silicon waveguide formed on a base or a substrate. In some embodiments, the base may be a semiconductor substrate. For example, in some embodiments the base may be a single crystal silicon substrate or a silicon-on-insulator substrate. It should be appreciated that any suitable substrate compatible with photonic integrated circuits may be used as a base in some embodiments. In some embodiments, a pump laser may be integrated in the PIC to save device footprint and cost, among other benefits. For example, in some embodiments a pump laser may be formed in the same base as the silicon waveguide and the waveguide amplifier, such that they are integrated within the PIC. In some embodiments, the pump laser may be formed in the base using epitaxial growth of a diode laser on the base. In some embodiments, a diode laser may be placed inside a cavity on the base. For example, in some embodiments the pump laser may be formed on a separate chip from the PIC initially and then placed within a cavity of the PIC or otherwise mounted to the PIC. In some embodiments, the pump laser has a center wavelength of between 880 and 1080 nm, between 930 nm and 1030 nm, or any value or range of values within such ranges, including 980 nm in some embodiments.

According to an aspect of the present application, a PIC is provided including a multiplexer on a base configured to mix pump light from a pump laser and an optical signal from a silicon waveguide before transmitting the mixed light signal to a waveguide amplifier integrated on the PIC. In some embodiments, the multiplexer, pump laser, silicon waveguide and waveguide amplifier are formed on the same base as part of the PIC. The inventors have recognized that because silicon absorbs 980 nm wavelength light, when pump light with a center wavelength of 980 nm is used in a PIC as described in any of the embodiments above, the pump light may be attenuated when propagating through a silicon waveguide. In some embodiments, a waveguide with a material that is not silicon is provided to couple the pump light having approximately a 980 nm center wavelength from an output of the pump laser to an input of the multiplexer, where the 980 nm pump light is mixed with the optical signal transmitted from a silicon waveguide. In one non-limiting example, a silicon nitride or $Si_3N_4$ waveguide is used to couple the pump light to the multiplexer, as silicon nitride attenuates 980 nm light much less than silicon. In some embodiments, the waveguide amplifier, the silicon nitride waveguide coupling the pump light and the silicon waveguide may be disposed on three different planes and are spaced at different distances from a surface of the base, such that the pump light is separated from the silicon waveguide prior to being mixed with the optical signal carried by the silicon waveguide.

Figure 1:
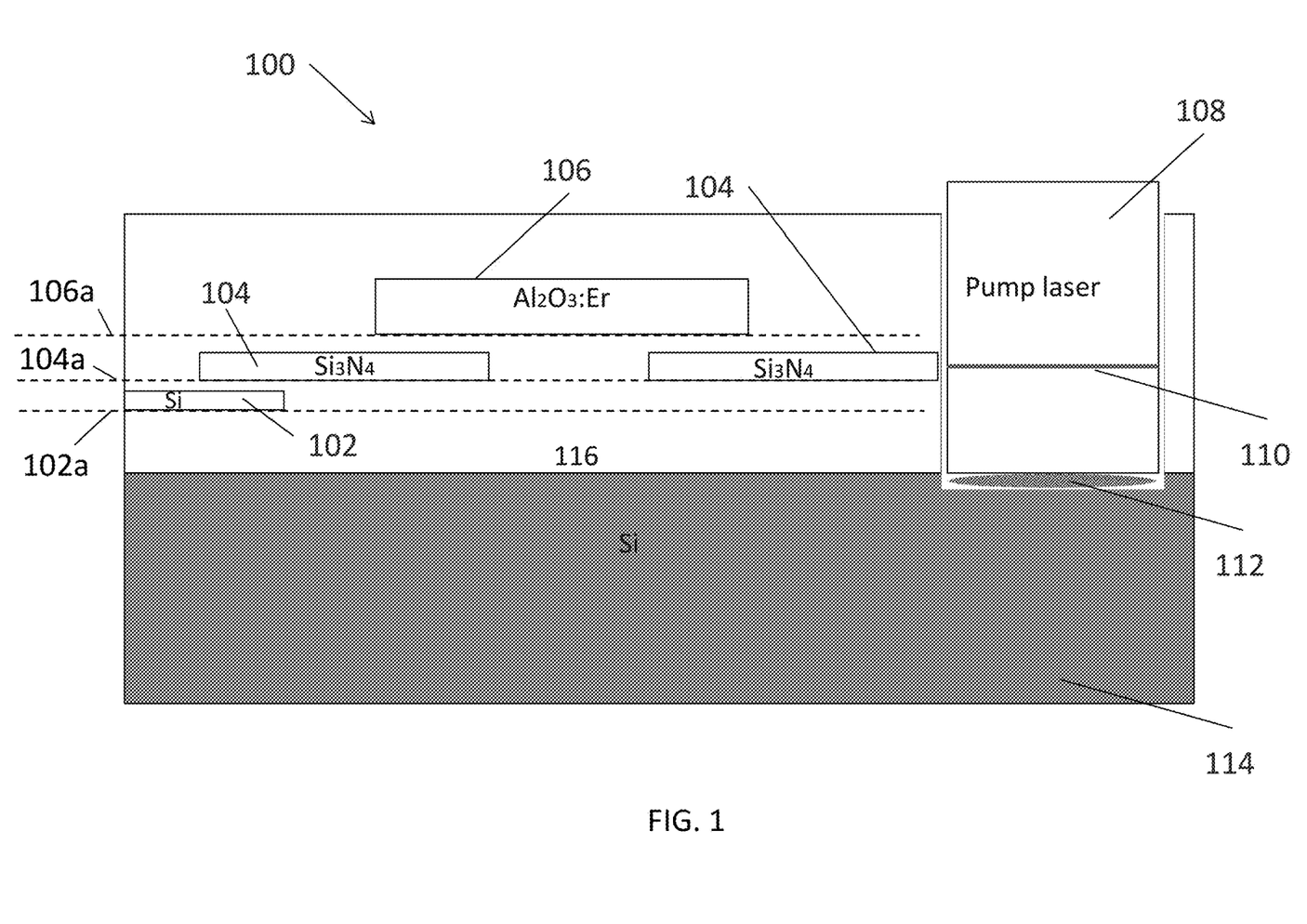
FIG. 1 is a schematic diagram showing the plan view of a photonic integrated circuit with a three-waveguide-layer structure according to an aspect of the present application.

FIG. 1 is a plan view diagram showing components of a non-limiting example of a photonic integrated circuit that includes a three-waveguide-layer structure 100 according to aspects of the present application. In the non-limiting embodiment in FIG. 1, the bottom waveguide layer comprises one or more waveguides 102 of a first type disposed in a first plane 102a. In one example, the waveguide 102 of the first type is a silicon waveguide. The waveguide 102 of the first type may have a thickness between 200-300 nm in some embodiments. The waveguide 102 may have a thickness of 220 nm in some embodiments. Other values for the thickness of the waveguide 102 may be employed in alternative embodiments. Referring again to the non-limiting embodiment of FIG. 1, the waveguide 102 of the first type is configured to guide an optical signal to be amplified by an optical amplifier.

The middle waveguide layer (or, more generally, an intermediate waveguide layer of a multi-layer waveguide structure as described herein) of the three-waveguide-layer structure of FIG. 1 comprises one or more waveguides 104 of a second type different than the first type and disposed in a second plane 104a. Waveguides 102 and 104 may differ in material, as an example. In one example, the waveguide(s) 104 of the intermediate waveguide layer comprise silicon nitride or $Si_3N_4$. The waveguide 104 may have a thickness between 250-350 nm, including any value within that range. In some embodiments, the waveguide 104 has a thickness of approximately 300 nm. Other thickness values may be employed in alternative embodiments.

The top (or uppermost) layer of the three-waveguide-layer structure of FIG. 1 comprises a waveguide 106 of a third type different than the first and second types, and disposed in a third plane 106a. In one example, the waveguide 106 of the third type is a dielectric waveguide. In one example, the waveguide of the third type is a waveguide amplifier for amplifying an optical signal. In some embodiments, the waveguide 106 of a third type 106 is an Er-doped waveguide amplifier. For example, the waveguide 106 may be an Er-doped $Al_2O_3$ dielectric waveguide, hereinafter also referred to as an $Al_2O_3$:Er waveguide. The waveguide 106 may have any suitable thickness. For example, the waveguide 106 may be between 800-1200 nm thick, including any value within that range. In some embodiments, the waveguide 106 is approximately 1000 nm thick.

Referring again to FIG. 1, in some embodiments, the three waveguides 102, 104 and 106 are formed on the base 114 and are embedded in a dielectric material 116 such as silicon oxide, although other suitable dielectric materials may be sued. In the example of FIG. 1, the dielectric material 116 is illustrated as a contiguous layer for simplicity of illustration. In embodiments not shown in FIG. 1, the dielectric material 116 may comprise multiple layers of dielectric material formed at different stages of fabrication of the three-waveguide-layer structure 100. In such situations, the multiple layers of dielectric material may include layers of different dielectric materials.

Referring again to FIG. 1, a non-limiting example of the operation of the three-waveguide-layer structure 100 is now described. In general, light may be coupled between the layers of the multi-waveguide-layer structure adiabatically using inverse tapers, although other coupling techniques may be used. In the exemplary embodiment in FIG. 1, a pump laser 108 couples output light 110 to the one or more waveguides 104 in the intermediate layer. In some embodiments, the pump laser is an uncooled pump laser. In one example, the pump laser is an integrated 980-nm wavelength pump laser. It should be appreciated that any suitable laser source may be used as the pump laser. In some embodiments, the pump laser outputs pump light to pump a waveguide amplifier such as the waveguide 106. In the example illustrated, the waveguide 106 may be an Er-doped waveguide amplifier.

Referring again to FIG. 1, in some embodiments, the one or more waveguides 104 of the second type are coupled to the pump laser 108 and comprise a silicon nitride or $Si_3N_4$ waveguide in the intermediate layer. It should be appreciated that the $Si_3N_4$ waveguide may be transparent to 980-nm wavelength light while a Si waveguide is not, and that a $Si_3N_4$ waveguide has an intermediate refractive index between silicon and $Al_2O_3$:Er. As a result of these properties, coupling light into a Si₃N₄ waveguide as the intermediate (e.g., middle) layer between the layer with the silicon waveguide and the layer with Er-doped waveguide amplifier is simpler and more efficient compared to coupling light into a silicon waveguide as the intermediate layer.

In the illustrated non-limiting embodiment of FIG. 1, the top layer of the multi-waveguide-layer structure comprises a $Al_2O_3$:Er waveguide as a fully etched channel waveguide. Providing a fully etched channel waveguide allows for a good overlap between the optical signal and pump light and ensures that the entire $Al_2O_3$:Er cross section is pumped.

In some embodiments, the three-waveguide-layer structure 100 further comprises a base or substrate 114 on which waveguides 102, 104 and 106 are located. In one example, substrate 114 comprises silicon. In the non-limiting embodiment of FIG. 1, pump laser 108 is fixed to substrate 114 using adhesive 112. While not illustrated, a multi-layered waveguide structure such as that shown in FIG. 1 may optionally include germanium structures as well, such as germanium photodetectors.

It should be appreciated that FIG. 1 may represent a portion of PIC. That is, the base 114 may extend further to the left and/or right in the figure, and structures in addition to those shown may be included.

Aspects of the present application are related to a process to fabricate a multi-waveguide-layer structure. For example, the process may be used to fabricate the three-waveguide-layer structure of FIG. 1. In some embodiments, the process may involve depositing $Al_2O_3$:Er after Si implants are performed. In some embodiments, germanium structures are optionally formed, such as germanium photodetectors. When germanium structures are included, the $Al_2O_3$:Er may be deposited before Ge growth, for example, before epitaxial germanium growth. This allows for a relatively high temperature $Al_2O_3$:Er deposition.

Figure 3:
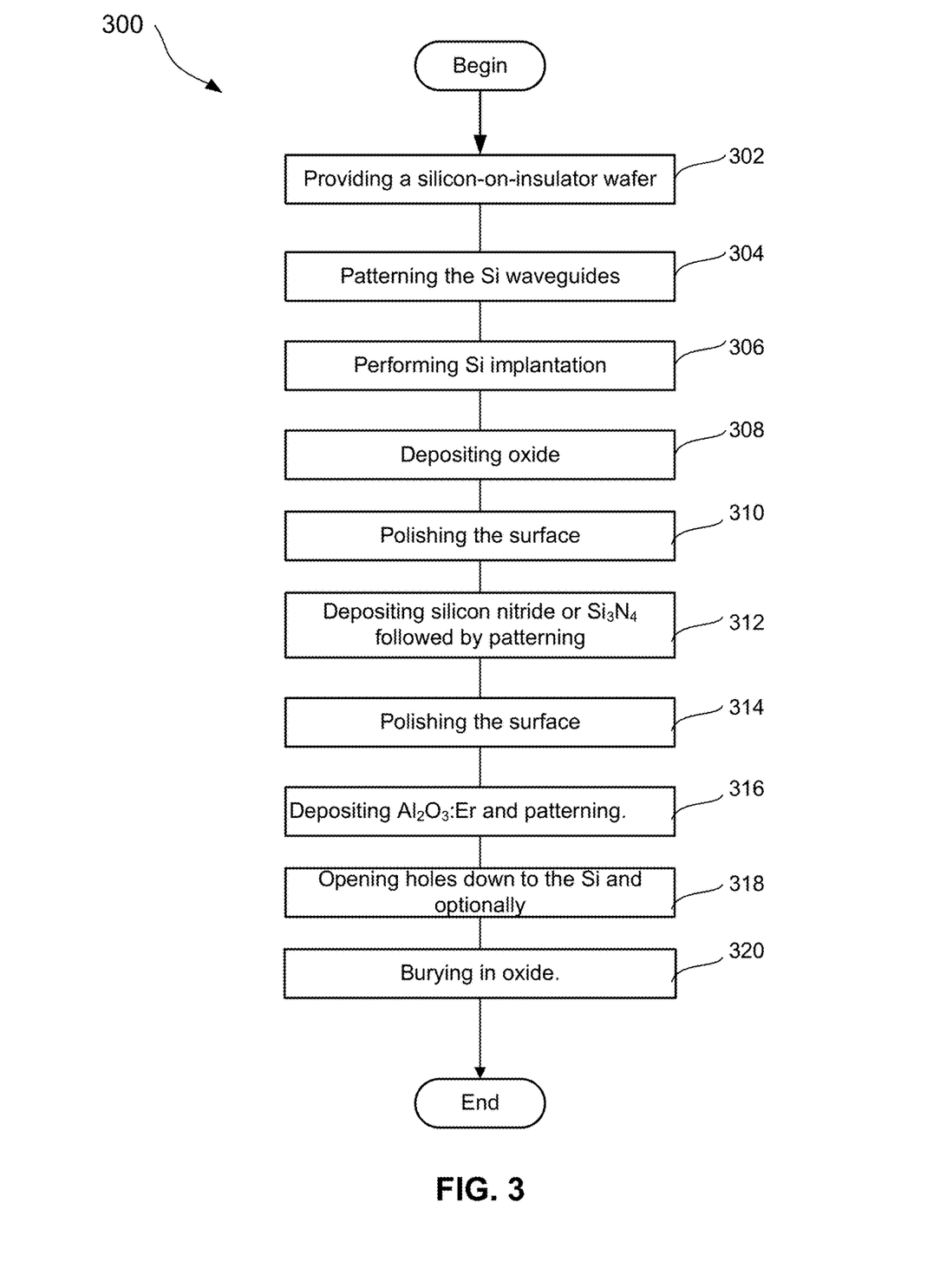
FIG. 3 is a flow diagram showing an exemplary process for fabricating the three-waveguide-layer structure of FIG. 1, according to an aspect of the present application.

FIG. 3 is a flow diagram showing an exemplary process 300 for fabricating a three-waveguide-layer structure, according to an aspect of the present application. For example, the method 300 may be used to fabricate the three-waveguide-layer structure of FIG. 1.

Returning to FIG. 3, the method 300 may begin at act 302 by providing a silicon-on-insulator (SOI) wafer. In an alternative embodiment not illustrated, the method may utilize a bulk silicon wafer.

Returning to FIG. 3, the method may proceed at act 304 with patterning the Si waveguides on the SOI substrate. At act 306, the method involves performing Si implantation. For example, doping regions may be created with a suitable doping process.

The method 300 proceeds at act 308 with depositing oxide. In alternative embodiments not illustrated, other dielectric materials may be used.

Returning to FIG. 3, the method proceeds at act 310 with polishing the surface (e.g., using Chemical mechanical polishing (CMP)) such that the surface is flat. At act 312, the method involves depositing silicon nitride or Si₃N₄ followed by patterning. For example, Si₃N₄ waveguides may be patterned.

The method proceeds at act 314 with polishing the surface (e.g., using CMP) such that the surface is flat. Subsequently, at act 316, the method involves depositing $Al_2O_3$:Er and patterning to form a waveguide.

The method 300 proceeds at act 318 with opening holes down to the Si and optionally growing Ge. For example, although not illustrated in FIG. 3, the method may optionally involve forming a germanium photodetector.

Returning to FIG. 3, the method 300 proceeds at act 320 with burying the structure in oxide or another dielectric.

It should be appreciated that in some embodiments, one or more of the acts in the example process 300 discussed above may be omitted. Alternatively or additionally, other process steps may be introduced. The steps in a process may be in any suitable order to fabricate the three-waveguide-layer structure.

According to aspects of the present application, the three-waveguide-layer structure as disclosed in some embodiments may advantageously allow monolithic integration of one or more components selected from a group comprising: modulators, photodetectors, phase shifters, variable optical attenuators, couplers, polarization rotators/splitters, and uncooled optical gain.

According to some aspects, the structure as disclosed in some embodiments may allow the entire cross-section of the waveguide in the top layer (e.g., the $Al_2O_3$:Er waveguide) to be pumped.

According to some aspects, the structure as disclosed in some embodiments may include a pump laser (e.g., a 980-nm wavelength pump laser) fabricated in a trench on the wafer, which may be individually and/or hermetically sealed.

Figure 2:
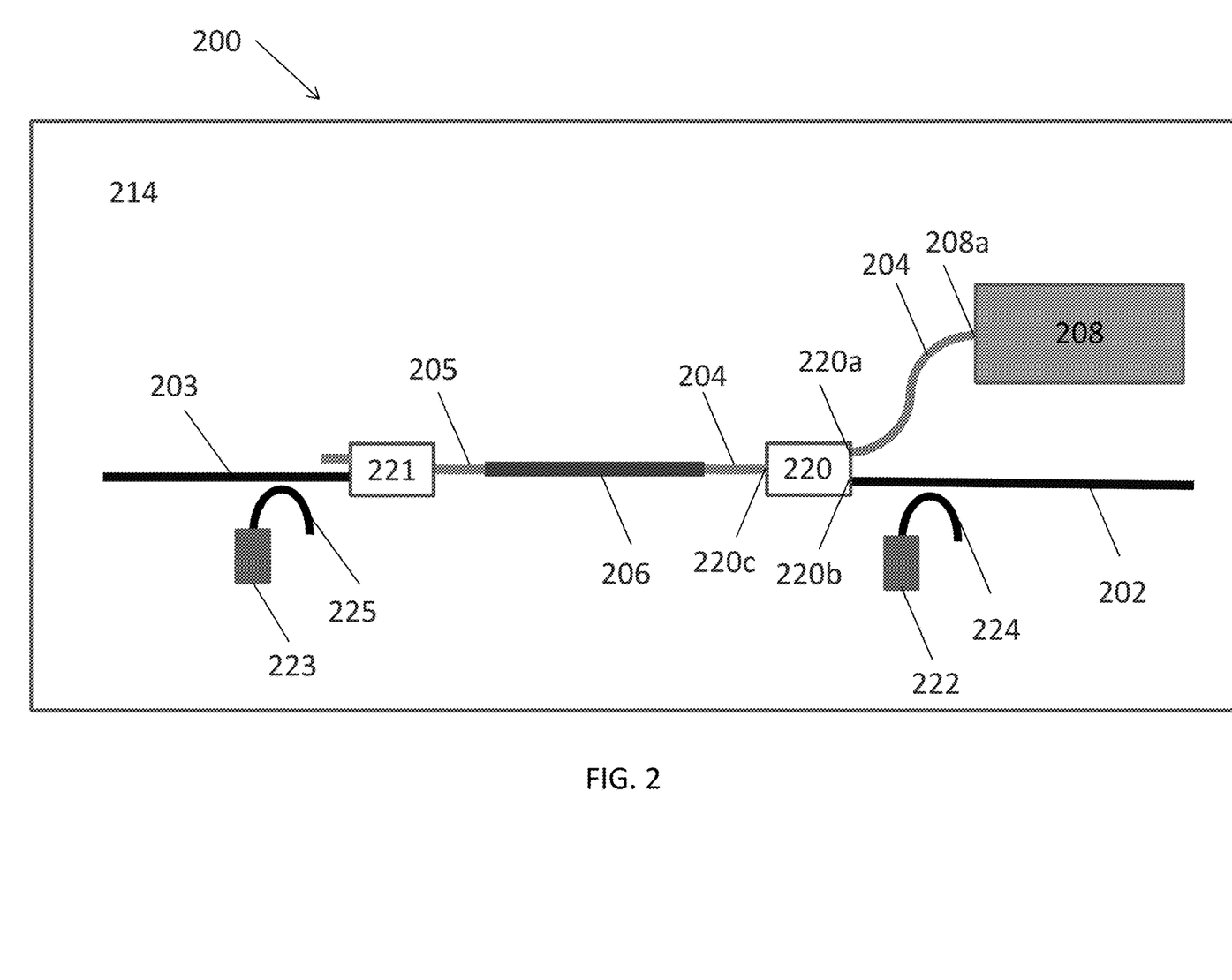
FIG. 2 is a schematic diagram showing a top view of components of a photonic integrated circuit, according to aspects of the present application.

FIG. 2 is a schematic diagram showing a top view of components of a photonic integrated circuit 200, according to an aspect of the present application.

In the embodiment shown in FIG. 2, photonic integrated circuit (PIC) 200 includes a base 214. The PIC 200 includes a waveguide amplifier 206 for amplifying optical signals transmitted from a silicon waveguide 202 in the PIC 200. In some embodiments, the waveguide amplifier may be an Er-doped $Al_2O_3$ waveguide amplifier. In the non-limiting example of FIG. 2, pump light is provided from an pump laser output 208a of a pump laser 208 to the waveguide amplifier 206. The silicon waveguide 202 provides an optical signal to an input of the optical amplifier, such that the optical signal is amplified inside the waveguide amplifier.

In the illustrated non-limiting example, the pump laser 208 may be integrated in the PIC to save device footprint and cost, among other benefits. In some such embodiments, a pump laser may be formed in the same base as the silicon waveguide and the waveguide amplifier, such that they are integrated within the PIC. Any suitable techniques may be used to form the pump laser in the base, such as but not limited to epitaxial growth of a diode laser on the base, or placing a diode laser inside a cavity on the base. In some embodiments, the pump laser has a center wavelength of between 880 and 1080 nm, between 930 nm and 1030 nm, or approximately 980 nm.

In the non-limiting embodiment of FIG. 2, a multiplexer 220 may be provided on the base 214. The multiplexer 220 may be configured to mix the pump light received at a second input 220b from the pump laser 208 and the optical signal received at a first input 220a from the silicon waveguide 202 before transmitting the mixed light signal to the waveguide amplifier at a multiplexer output 220c. In some embodiments, the multiplexer, pump laser, silicon waveguide and waveguide amplifier are formed on the same base as the PIC. In some embodiments, the multiplexer may be a wavelength-division multiplexer (WDM), although any suitable multiplexer may be used.

In some embodiments, the pump light from the pump laser 208 has a 980 nm center wavelength. In one non-limiting example, the optical signal carried in silicon waveguide 202 has a center wavelength of approximately 1550 nm and may be injected from components outside of the base 214 (not shown) or from other on-chip photonic components in the PIC 200 not shown in FIG. 2. A silicon nitride or $Si_3N_4$ waveguide 204 that is transparent to 980 nm wavelength light couples the pump light with 980 nm center wavelength from the pump laser output 208a of the pump laser 208 to the second input 220b of the multiplexer 220, where the 980 nm pump light is mixed with the optical signal transmitted from the silicon waveguide 202. One or more silicon nitride waveguide 204 may be provided to carry mixed optical signals with pump light. For example, a silicon nitride waveguide 204 may couple the multiplexer output 220c with the waveguide amplifier 206 to inject the mixed optical signals into the waveguide amplifier 206. Additionally, a silicon nitride waveguide 205 may couple an output of the waveguide amplifier 206 to an input of a second multiplexer 221 for demultiplexing the output of the waveguide amplifier and to separate the amplified optical signal with 1550 nm wavelength from the pump light with 980 nm wavelength. The amplified optical signal may be carried from second multiplexer 221 from another silicon waveguide 203.

Optionally and additionally, in some embodiments, germanium structures 222 and 223 may be formed on the base 214 as photodetectors. Germanium photodetector 222 may be provided and coupled to the silicon waveguide 202 via coupler 224. A second germanium photodetector 223 may be provided on the base 214 and coupled to the silicon waveguide 203 via coupler 225.

Figure 4:
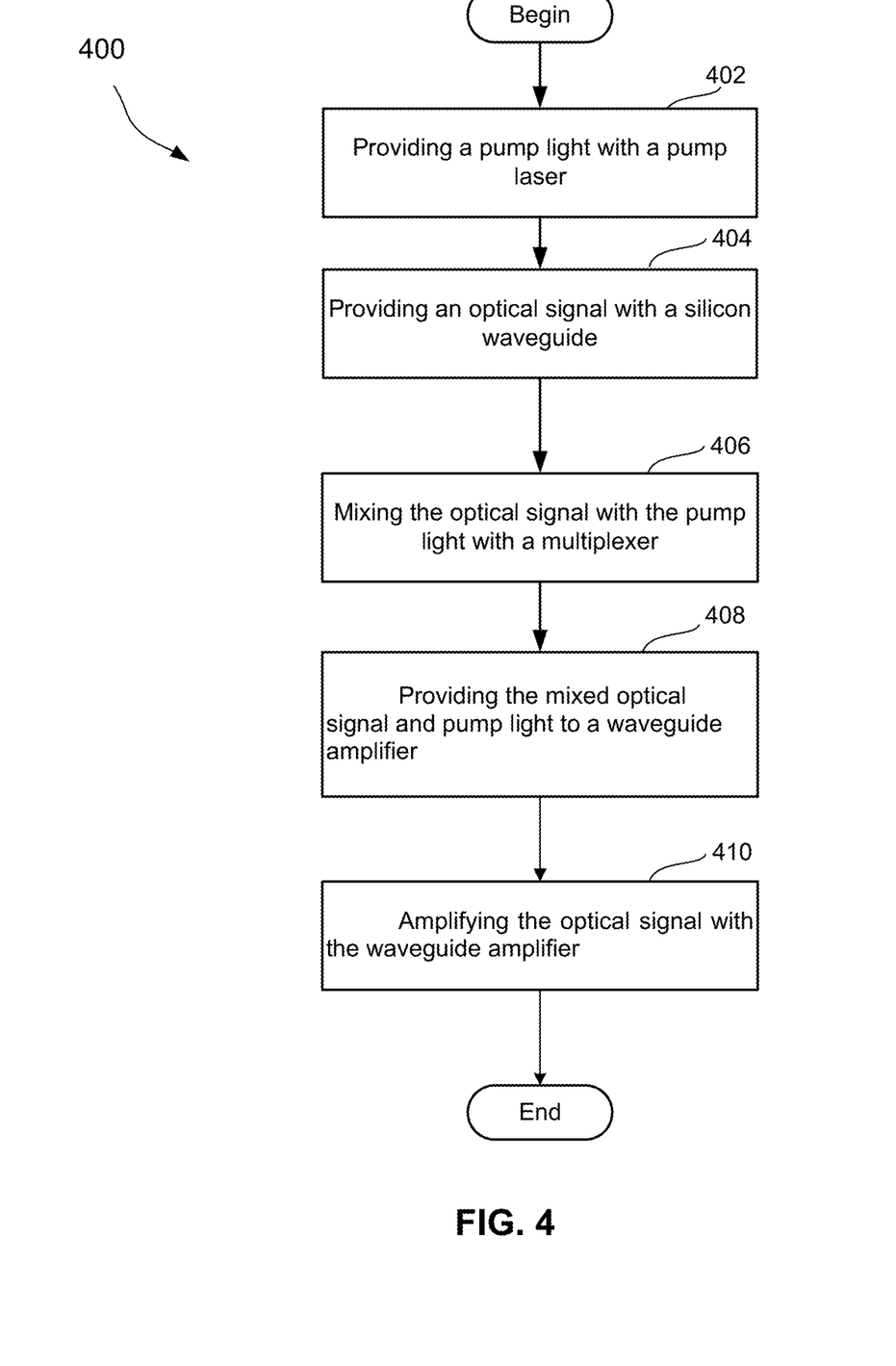
FIG. 4 is a flow diagram showing an exemplary method for operating a photonic integrated circuit of the types described in connection with FIGS. 1 and 2, according to an aspect of the present application.

FIG. 4 is a flow diagram showing a non-limiting method 400 for operating a photonic integrated circuit of the types shown in FIGS. 1 and 2, according to an aspect of the present application. The method 400 begins at act 402 with providing pump light with a pump laser. The pump light may have a center wavelength of between 880 and 1080 nm in some embodiments. The pump light may have a center wavelength between 930 nm and 1030 nm in some embodiments. For example, the pump light may have a center wavelength of approximately 980 nm.

The method 400 proceeds at act 404 with providing an optical signal with a silicon waveguide. The optical signal may have a center wavelength of 1550 nm.

The method 400 proceeds at act 406 with mixing the optical signal with the pump light with a multiplexer. The multiplexer, the silicon waveguide and the pump laser may be disposed on the same base of the photonic integrated circuit.

Next, at act 408, the method 400 involves providing the mixed optical signal and pump light to a waveguide amplifier. The waveguide amplifier may be an Er-doped $Al_2O_3$ amplifier disposed on the same base of the photonic integrated circuit.

Next, at act 410, the method 400 involves amplifying the optical signal with the waveguide amplifier.

It should be appreciated that in some embodiments, one or more of the acts in the exemplary method 400 discussed above may be omitted. Alternatively or additionally, other acts may be introduced. The acts in method 400 may be in any suitable order for operating the photonic integrated circuit.

Figure 5:
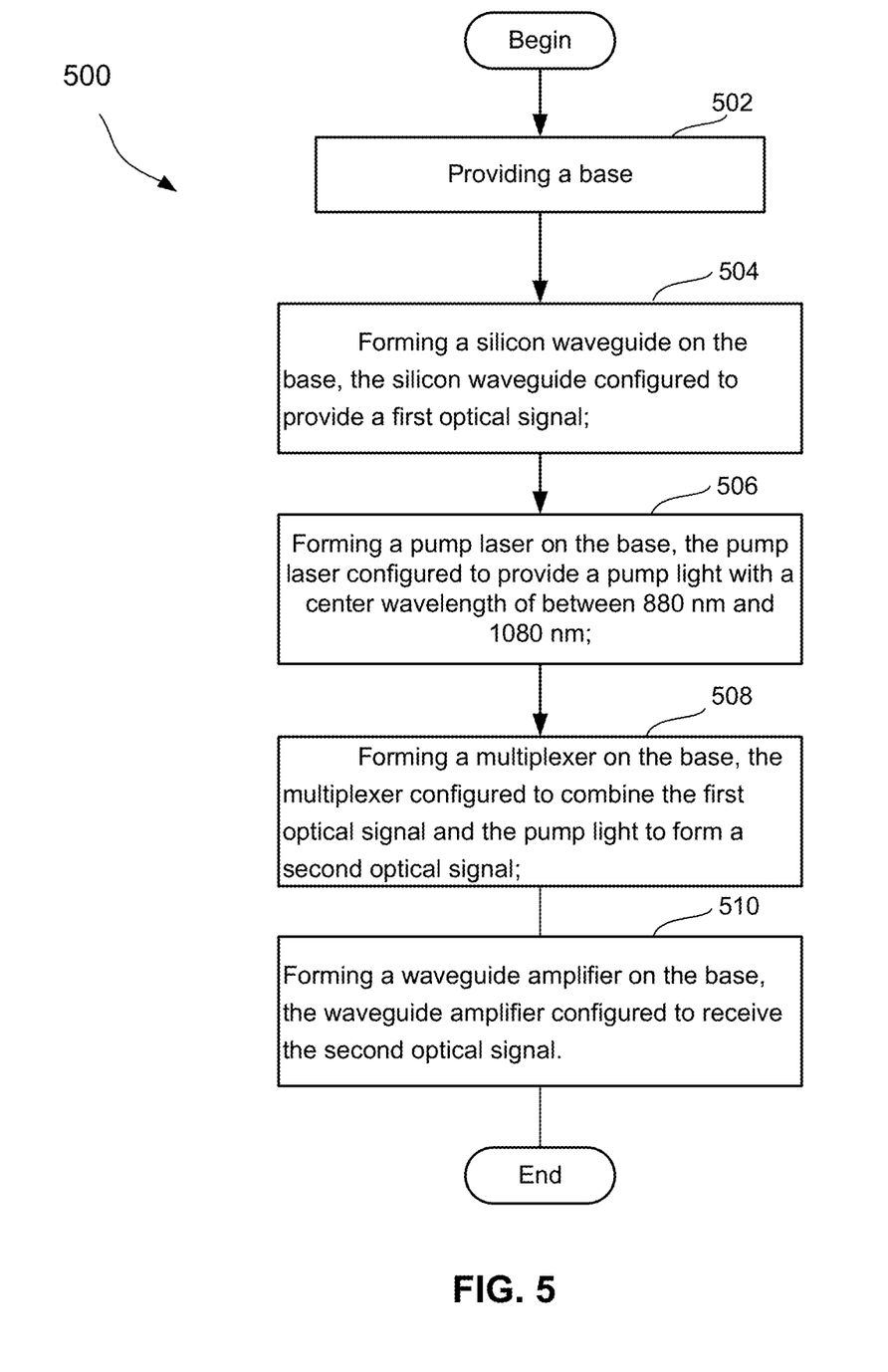
FIG. 5 is a flow diagram showing an exemplary method for fabricating photonic integrated circuits of the types described in connection with FIGS. 1 and 2, according to an aspect of the present application.

FIG. 5 is a flow diagram showing a non-limiting method 500 for fabricating photonic integrated circuits of the types described in connection with FIGS. 1 and 2, according to an aspect of the present application. The method 500 begins at act 502 with providing a base. The base may be a SOI base, a bulk silicon substrate, or any other suitable base. Then at act 504, the method involves forming a silicon waveguide on the base. The silicon waveguide may be configured to provide a first optical signal.

The method 500 also includes, at act 506, forming a pump laser on the base, the pump laser may be configured to provide pump light with a center wavelength of between 880 nm and 1080 nm in some non-limiting embodiments. Act 506 is optional, as in an alternative embodiment not illustrated in FIG. 5 the pump laser may already be integrated with the PIC.

The method 500 of FIG. 5 further comprises, at act 508, forming a multiplexer on the base. The multiplexer may be configured to combine the first optical signal and the pump light to form a second optical signal.

Next, at act 510, the method 500 may include forming a waveguide amplifier on the base. The waveguide amplifier may be configured to receive the second optical signal. The waveguide amplifier may be further configured to provide at an amplifier output an amplified signal based in part on the first optical signal carried in the silicon waveguide at act 504.

It should be appreciated that in some embodiments, one or more of the acts in the exemplary method 500 discussed above may be omitted. Alternatively or additionally, other acts may be introduced. The acts in method 500 may be in any suitable order for operating the photonic integrated circuit.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A photonic integrated circuit comprising:
   a base;
   a first waveguide comprising a first material disposed on the base in a first plane, wherein the first waveguide is a silicon waveguide configured to provide a first optical signal;
   a second waveguide comprising a second material disposed on the base in a second plane;
   a third waveguide comprising a third material disposed on the base in a third plane, wherein the third waveguide is a waveguide amplifier;
   a pump laser disposed on the base with a pump laser output, wherein the pump laser is configured to provide pump light at the pump laser output with a center wavelength between 880 nm and 1080 nm; and
   a multiplexer disposed on the base with a first input coupled to the silicon waveguide, a second input coupled to the pump laser output and a multiplexer output coupled to the waveguide amplifier,
   wherein the multiplexer is configured to provide at the multiplexer output a second optical signal based in part on a combination of the first optical signal and the pump light,
   wherein the second plane is disposed in between the first plane and third plane; and
   wherein the pump laser is configured to provide pump light to the second waveguide of the second material.

2. The photonic integrated circuit of claim 1, wherein the second waveguide is configured to couple the pump light to the waveguide amplifier.

3. The photonic integrated circuit of claim 2, wherein the third material is Er-doped $Al_2O_3$.

4. The photonic integrated circuit of claim 2, wherein the silicon waveguide is configured to carry an optical signal, and wherein the waveguide amplifier is configured to amplify the optical signal.

5. The photonic integrated circuit of claim 2, wherein the second material is silicon nitride.

6. The photonic integrated circuit of claim 1, wherein the pump light has a center wavelength between 930 nm and 1030 nm.

7. A photonic integrated circuit comprising:
   a base;
   a waveguide amplifier disposed on the base;
   a silicon waveguide disposed on the base and configured to provide a first optical signal;
   a pump laser disposed on the base with a pump laser output, wherein the pump laser is configured to provide pump light at the pump laser output with a center wavelength between 880 nm and 1080 nm;
   a multiplexer disposed on the base with a first input coupled to the silicon waveguide, a second input coupled to the pump laser output and a multiplexer output coupled to the waveguide amplifier;
   a silicon nitride waveguide disposed on the base between the pump laser output and the second input of the multiplexer, wherein the silicon nitride waveguide is configured to couple the pump light at the pump laser output with the second input of the multiplexer,
   wherein the multiplexer is configured to provide at the multiplexer output a second optical signal based in part on a combination of the first optical signal and the pump light, and wherein:
   the silicon waveguide is disposed in a first plane;
   the silicon nitride waveguide is disposed in a second plane;
   the waveguide amplifier is disposed in a third plane, and the second plane is disposed in between the first plane and third plane.

8. The photonic integrated circuit of claim 7, wherein the waveguide amplifier comprises Er-doped $Al_2O_3$.

9. The photonic integrated circuit of claim 7, wherein the pump light has a center wavelength of between 930 nm and 1030 nm.

10. The photonic integrated circuit of claim 7, wherein the pump light has a center wavelength of 980 nm.

11. The photonic integrated circuit of claim 7, wherein the base comprises silicon.

12. The photonic integrated circuit of claim 7, further comprising a photodetector integrated on the base and coupled to the silicon waveguide, wherein the photodetector comprises germanium.

13. A method for fabricating a photonic integrated circuit, the method comprising:
   providing a base;
   forming a silicon waveguide on the base, the silicon waveguide configured to provide a first optical signal;
   forming a multiplexer on the base, the multiplexer configured to combine the first optical signal and pump light from a pump laser having a center wavelength of between 880 nm and 1080 nm to form a second optical signal; and
   forming a waveguide amplifier on the base, the waveguide amplifier configured to receive the second optical signal; and
   forming a silicon nitride waveguide on the base, the silicon nitride waveguide configured to couple the pump light to the multiplexer, wherein:
   forming the silicon waveguide comprises forming the silicon waveguide in a first plane;
   forming the silicon nitride waveguide comprises forming the silicon nitride waveguide in a second plane; and
   forming the waveguide amplifier comprises forming the waveguide amplifier in a third plane, wherein the second plane is disposed in between the first plane and third plane.

14. The method of claim 13, wherein the waveguide amplifier comprises Er-doped $Al_2O_3$.

15. The method of claim 13, wherein the pump light has a center wavelength of between 930 nm and 1030 nm.

16. The method of claim 13, wherein the pump light has a center wavelength of 980 nm.

* * * * *